Dec. 23, 1941.        B. E. O'HAGAN        2,266,898
RAILWAY TRACK CIRCUIT APPARATUS
Filed Nov. 24, 1939
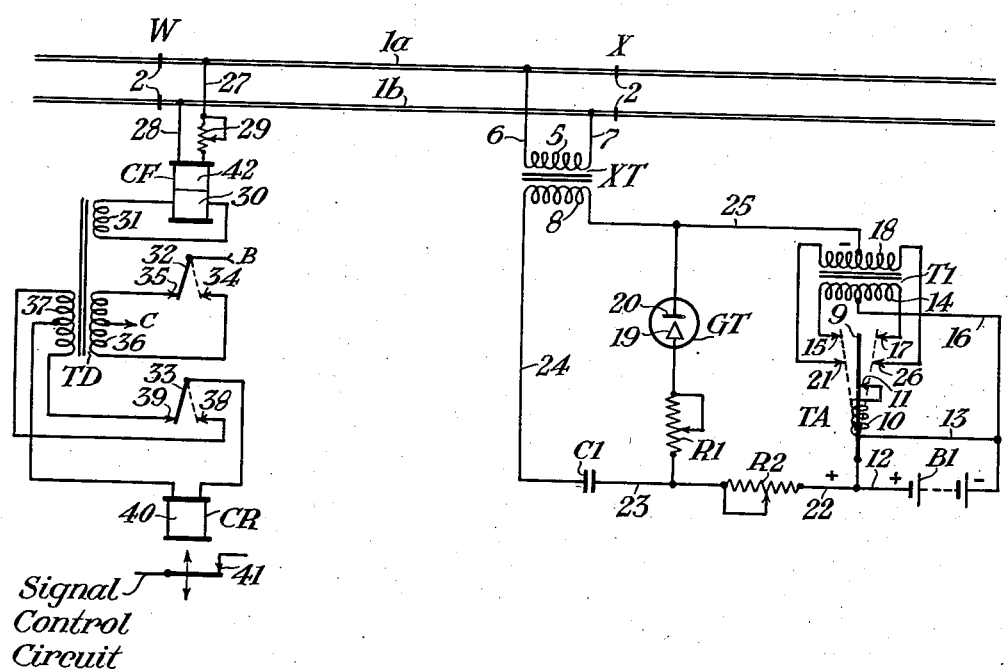
INVENTOR
Bernard E. O'Hagan.
BY
HIS ATTORNEY Patented Dec. 23, 1941

2,266,898

UNITED STATES PATENT OFFICE 2,266,898

RAILWAY TRACK CIRCUIT APPARATUS

Bernard E. O'Hagan, Swissvale, Pa., assignor to The Union Switch & Signal Company, Swissvale, Pa., a corporation of Pennsylvania Application November 24, 1939, Serial No. 305,867

1 Claim. (Cl. 246—34)

My invention relates to railway track circuit apparatus, and particularly to apparatus for track circuits using coded direct current.

Railway track circuits have been proposed which use coded or time spaced impulses of direct current with the individual impulses of relatively high peak voltage and of short duration as compared with the duration between successive impulses. The high peak voltage serves as an aid to the shunting sensitivity of the track circuit and the short duration serves to limit the output of the current source which ordinarily is a battery. Heretofore, it has been proposed to create such impulses of direct current by supplying current from a battery to a winding of a reactor or transformer to store up energy in the magnetic circuit of such reactor or transformer, and to periodically interrupt the supply of current to such winding, allowing the stored magnetic energy to die away rapidly and thereby induce in another winding of the reactor an electromotive force which is applied to the track circuit, causing an impulse of direct current to flow in the track circuit.

A code transmitter is ordinarily used to periodically interrupt the current and the construction usually provided for such transmitter requires an extra source of current for its operation. The reactor may require a relatively large magnetic circuit in order to store sufficient magnetic energy therein. Also adjustments of the apparatus that can be made in the field are desirable so that the peak voltage, the rate of occurrence and duration of the current impulses can be controlled to suit the different local conditions of the different track circuits.

Accordingly, a main object of my invention is the provision of novel and improved apparatus for track circuits of the type here contemplated wherewith a single source of direct current supplies all the energy required for the apparatus of a track circuit, and which apparatus can be adjusted in the field readily to control the peak voltage, the rate of occurrence and duration of the time spaced impulses of current to suit the local conditions. To accomplish this and other objects of my invention I provide means which utilize the electrostatic energy stored in a capacitor rather than the magnetic energy stored in a reactor. The capacitor is periodically charged and discharged, each discharge being effective to cause an impulse of direct current to flow in the track circuit. Preferably a small tuned alternator is used to convert the relatively low direct voltage of a battery into a relatively high alternating voltage which is rectified and applied to the capacitor through an adjustable charging resistor to charge the capacitor with unidirectional current, the time interval required for the potential across the capacitor to build up to that of the rectified voltage being predetermined within limits by such charging resistor. A gas filled or rectifier tube which is connected with said capacitor breaks down when a preselected potential is built up across the terminals of the capacitor and the capacitor discharges through a circuit including an adjustable discharging resistor and the primary winding of a track transformer whose secondary winding is connected with the track circuit. The sudden rush of discharge current through the primary winding of the track transformer induces an electromotive force in the secondary winding thereof and this electromotive force causes an impulse of direct current to flow in the track circuit. With the capacitor discharged the tube becomes non-conductive and the operation of charging the capacitor is again initiated. The charging and discharging resistors determine in part the peak voltage and duration of the current impulse supplied to the track circuit as well as the rate of occurrence of the impulses. Such resistors can be adjusted in the field readily so that these characteristics of the track circuit current impulses can be controlled to suit the local conditions of the associated track circuit. Conversion of the low direct voltage into the relatively high alternating voltage and rectification thereof for charging the capacitor with unidirectional current makes it possible to use a relatively small capacitor. Since the track transformer is used to transfer power only it can be arranged to impedance match the track circuit and to transfer the small amount of power required at high efficiency. Consequently with such apparatus the total energy output of the battery is relatively low.

I shall describe one form of apparatus embodying my invention, and shall then point out the novel features thereof in the claim.

The accompanying drawing is a diagrammatic view showing a preferred form of apparatus embodying my invention. Referring to the drawing, the reference characters $1a$ and $1b$ designate the track rails of a stretch of railway track which rails are formed by the usual insulated rail joints 2 into a track section W—X, which section may be one section of a series of consecutive track sections of a signal system.

The track section W—X is provided with a track circuit which has a source of coded or time spaced impulses of direct current connected across the rails at one end of the section and a code following track relay connected across the rails at the other end of the section. The source of coded or time spaced impulses of current for the track circuit of section W—X includes a battery B1, a tuned alternator TA, a transformer T1, a gas filled or rectifier tube GT, a capacitor C1, two resistors R1 and R2, and a track transformer XT.

The track transformer XT is provided with a secondary winding 5 which is connected across the rails of section W—X over wires 6 and 7, and with a primary winding 8. The windings of transformer XT are preferably so proportioned as to match the impedance of the track circuit including the rails of section W—X and to efficiently transfer relatively small power from primary winding 8 to secondary winding 5 when current is supplied to the primary winding 8 in a manner to shortly appear.

The tuned alternator TA may be any one of several well-known forms for such devices, and since its specific structure forms no part of my invention it is sufficient for the instant application to point out that the tuned alternator TA includes a tuned reed member 9 mounted in magnetic relationship with a winding 10 to cause the reed member 9 to vibrate when current is supplied to winding 10 from battery B1 over a circuit including a contact 11 and the tuned reed member 9. When the reed member 9 occupies the position indicated by the solid line in the drawing, current flows from the positive terminal of battery B1 over wire 12, the lower portion of reed member 9, contact 11, winding 10 and wire 13 to the negative terminal of battery B1, and the tuned reed member 9 is caused to vibrate between the positions indicated by the dotted lines at its natural frequency, the energization of winding 10 being just sufficient to maintain vibration of member 9. With tuned reed member 9 vibrating, current from battery B1 is alternately supplied to the two half portions of primary winding 14 of transformer T1. When reed member 9 swings to its left-hand position as viewed in the drawing current flows from the positive terminal of battery B1 over wire 12, member 9, contact 15, the left-hand half portion of primary winding 14 to its mid terminal and wire 16 to the negative terminal of battery B1. When member 9 swings to its right-hand position as shown in the drawing, current flows from the positive terminal of battery B1 over wire 12, member 9, contact 17, the right-hand half portion of primary winding 14 to its mid terminal and wire 16 to the negative terminal of battery B1. This alternate supply of current to the two portions of primary winding 14 of transformer T1 causes an electromotive force to be induced in secondary winding 18 of that transformer, the frequency of such electromotive force corresponding to the frequency at which the member 9 is vibrating. The turn ratio of primary winding 14 and secondary winding 18 of transformer T1 is preferably such that the electromotive force induced in secondary winding 18 is of relatively high voltage.

This high alternating voltage induced in secondary winding 18 of transformer T1 is rectified and applied to capacitor C1 through the adjustable charging resistor R2. Starting from the left-hand terminal of secondary winding 18, a circuit can be traced over contact 21 and reed member 9 of alternator TA, wire 22, resistor R2, wire 23, capacitor C1, wire 24, primary winding 8 of track transformer XT and wire 25 to a mid terminal of secondary winding 18 of transformer T1. Also starting from the right-hand terminal of secondary winding 18, a circuit can be traced over contact 26 and reed member 9 of alternator TA, and thence as before traced to the mid terminal of secondary winding 18. The connections of secondary winding 18 are such that the current always flows through the circuit including capacitor C1 in the same direction. Due to the charging resistor R2 it takes a time interval predetermined in part by the adjustment of resistor R2, for the potential across the terminals of capacitor C1 to equal the maximum voltage of the electromotive force induced in secondary winding 18. This time interval required to charge the capacitor is made, for example, of the order of one-half second, so that the charging current flowing in primary winding 8 of transformer XT builds up relatively slow and little, if any, electromotive force is induced in the secondary winding 5 of the track transformer. At least the electromotive force induced in secondary winding 5 when the capacitor C1 is charged is so small in magnitude it can be neglected.

The gas filled tube GT may be any one of several well-known types of gas filled tubes and is preferably of the cold cathode type having an anode 19 and a cathode 20. The tube GT is connected in multiple across capacitor C1 and the primary winding 8 of transformer XT by having its anode 19 connected with wire 23 through the adjustable discharging resistor R1 and its cathode 20 connected with wire 25. Tube GT is so proportioned that when the potential across the terminals of capacitor C1 builds up to some predetermined value less than the maximum value of the electromotive force induced in secondary winding 18, the tube GT breaks down. Capacitor C1 now discharges through a circuit including wire 23, resistor R1, anode and cathode space of tube GT, wire 25, primary winding 8 of track transformer XT and wire 24 back to capacitor C1. This discharge circuit is so proportioned as to its time constant that the discharge is rapid and is of the order say, for example, of .01 second. This sudden rush of current through primary winding 8 of track transformer XT induces an electromotive force in the secondary winding 5 of the track transformer, which electromotive force is applied to the track circuit causing an impulse of current to flow in the track circuit.

The turn ratio of the windings of transformer XT is such that the current impulse applied to the track circuit is of relatively high peak voltage. Since the discharge of the capacitor C1 is effected in a relatively short interval of time, the duration of the impulse of current supplied to the track circuit is of relatively short duration. When the capacitor C1 is discharged the tube GT is restored to its non-conducting condition and the capacitor C1 is again charged to repeat the operation.

Consequently the operation of storing energy in capacitor C1 and the discharging of such energy through tube GT and the primary winding 8 of the track transformer XT is repeated over and over again as long as tuned alternator TA continues to be operated. Since the rate of charging and discharging capacitor C1 and the voltage applied thereto can be controlled within limits by resistors R1 and R2, it follows that the rate of occurrence of impulses of current supplied to the track circuit, the peak voltage of the impulses and the duration of the individual impulses can all be controlled in part by adjusting resistors R1 and R2 and such adjustment can be effected in the field readily.

The code following track relay connected with the track circuit of section W—X may be any one of several types responsive to time spaced impulses of direct current. The specific type of such code following relay forms no part of my invention and as here shown code following relay CF and its associated apparatus are those disclosed and claimed in a copending application for United States Letters Patent Serial No. 274,414, filed May 18, 1939, by Edward J. Agnew for Signaling apparatus. Code following relay CF is a two-winding polar relay, having a top or operating winding 42 connected across the rails of section W—X over wires 27 and 28, a resistor 29 being preferably interposed in wire 27. The lower or holding winding 30 of relay CF is connected across a secondary winding 31 of a decoding transformer TD to be referred to later. Relay CF is provided with two polar contact members 32 and 33 which are biased to seek a normal or left-hand position as viewed in the drawing when the relay is deenergized as well as being held in the normal position if the relay is energized by current of normal polarity. When relay CF is energized by current of reverse polarity, the contact members 32 and 33 are operated to the reverse or right-hand position as viewed in the drawing. The connection of the top winding 42 with the track rails is such that relay CF is energized at reverse polarity and its contact members 32 and 33 are operated to the right-hand position in response to the current flowing in winding 42 due to each current impulse supplied to the track circuit through the medium of track transformer XT and its associated apparatus. During the period between successive current impulses of the track circuit, the contact members 32 and 33 of relay CF are operated by the biasing element of the relay to their left-hand or normal position. It follows that the code following track relay CF is operated at a rate corresponding to the rate of occurrence of the track circuit current impulses.

With code following track relay CF operated and its contact member 32 made to alternately engage reverse contact 34 and normal contact 35, direct current from a source whose terminals are indicated at B and C is alternately supplied to the two portions of a primary winding 36 of decoding transformer TD as will be readily understood by an inspection of the drawing, and an electromotive force is induced in secondary winding 37 of transformer TD which electromotive force has a frequency corresponding to the rate at which relay CF is operated. When relay CF is operated, its other contact member 33 alternately engages a reverse contact 38 and a normal contact 39 and thereby alternately connects the two half portions of secondary winding 37 of transformer TD with the winding 40 of a control relay CR in the well-known manner, so that the electromotive force induced in secondary winding 37 is rectified and current flows in winding 40 of relay CR always in the same direction to effectively energize and pick up that relay.

The control relay CR is used to control a signal control circuit which as here shown includes a front contact 41 of relay CR. Relay CR is preferably slightly slow releasing in character so that it does not release during the interval the rectified current supplied thereto approaches its zero value. Relay CR may be slow to pick up to require operation of relay CF for a predetermined time interval before relay CR is picked up, or relay CR may have the ordinary pick-up characteristics.

Since the current impulses energizing winding 42 of relay CF are of short duration as compared with the duration between successive impulses, it follows the "on" period of relay CF during which its contact members 32 and 33 engage the reverse contacts 34 and 38, respectively, is short as compared to the "off" period of the relay during which contact members 32 and 33 engage normal contacts 35 and 39, respectively, unless some means is provided to retain relay CF at its reverse position after the current impulse supplied to winding 42 ceases.

To equalize the "on" and "off" periods of relay CF, the holding winding 30 of relay CF is connected with secondary winding 31 of transformer TD. Each time a track circuit current impulse flows in winding 42 to operate the contact member 32 to the right-hand position, that is, from the position engaging normal contact 35 to the position engaging reverse contact 34, the current flowing in the top half portion of primary winding 36 of transformer TD dies away when contact member 32 breaks engagement with normal contact 35, and current builds up in the lower half portion of primary winding 36 when contact member 32 makes engagement with reverse contact 34. Due to the connection of the two half portions of the primary winding 36, the dying away of current in the top portion and the building up of current in the lower portion causes the two electromotive forces induced in secondary winding 31 to be of the same polarity and hence cause current to flow in the winding 30 of a selected polarity. The connection of holding winding 30 with secondary winding 31 is such that the energization of relay CF created by current flowing in winding 30 of the relay when the relay is operated to its reverse position is of the same polarity as that created by the track circuit current impulse flowing in winding 42 of the relay with the result that relay CF is retained at its reverse position for an interval after the impulse of current flowing in winding 42 ceases. The parts are so proportioned that relay CF is operated with substantially equal "on" and "off" periods.

It is to be observed that when relay CF is restored to its normal position by its bias element, the current flowing in the lower portion of primary winding 36 dies away when contact member 32 breaks engagement with reverse contact 34 and current builds up in the top portion of primary winding 36 when the contact member 32 makes engagement with normal contact 35. The electromotive forces now induced in secondary winding 31 are both of the same polarity but are opposite in polarity to those induced in secondary winding 31 when the relay is operated to its reverse position. Consequently the current flowing in winding 30 due to electromotive forces induced in secondary winding 31 when the relay is operated back to its normal position energizes relay CF at a polarity such as to aid the bias of the relay.

Although I have herein shown and described only one form of apparatus embodying my invention, it is understood that various changes and modifications may be made therein within the scope of the appended claim without departing from the spirit and scope of my invention.

Having thus described my invention, what I claim is:

In track circuit apparatus for use with a track circuit including the track rails of a track section and a code following track relay which is effectively operated by impulses of direct current when each such impulse is at least of a preselected duration and the successive impulses are time spaced a given interval and which track circuit is characterized by a relatively high shunting sensitivity when the current impulses are of a relatively high peak voltage, the combination comprising, a track transformer having a secondary winding connected across the rails of the section, a relatively low voltage track battery, a tuned alternator having its winding connected to said battery for vibrating its reed contact member, a step-up transformer, means including a pair of contacts operated by said reed contact member to alternately supply current from said battery to two portions of the primary winding of said step-up transformer for inducing a relatively high alternating voltage in the secondary winding of that transformer and which alternating voltage has a predetermined maximum value, a first and a second adjustable resistor, a capacitor; a first circuit including a second pair of contacts operated by said reed contact member to series connect said first resistor, said capacitor and the primary winding of said track transformer to the secondary winding of said step-up transformer to charge said capacitor by unidirectional current at a rate determined in part by said first resistor; a gas filled tube having a breakdown voltage slightly less than the maximum value of said alternating voltage, a second circuit to series connect said second resistor and said tube across said capacitor and the primary winding of the track transformer to discharge the capacitor each time the voltage across the capacitor builds up to the breakdown voltage of the tube for inducing time spaced electromotive forces in the secondary winding of said track transformer each of which causes an impulse of direct current of said peak voltage to flow in the track circuit, and said first and second resistors effective by adjustments thereof to cause the current impulses supplied to the track circuit to be of said preselected duration and to be time spaced said given interval.

BERNARD E. O'HAGAN